US010385164B2

(12) United States Patent
Blanco González et al.

(10) Patent No.: US 10,385,164 B2
(45) Date of Patent: Aug. 20, 2019

(54) PROCESS FOR PREPARING POLYETHER CARBONATE POLYOLS

(71) Applicant: REPSOL, S.A., Madrid (ES)

(72) Inventors: María Dolores Blanco González, Mostoles-Madrid (ES); Mónica García Ruiz, Mostoles-Madrid (ES); Julián Pedro González Rivero, Mostoles-Madrid (ES)

(73) Assignee: REPSOL, S.A, Madrid (ES)

(*) Notice: Subject to any disclaimer, the term of this patent is extended or adjusted under 35 U.S.C. 154(b) by 54 days.

(21) Appl. No.: 14/911,669

(22) PCT Filed: Aug. 11, 2014

(86) PCT No.: PCT/EP2014/067158
§ 371 (c)(1),
(2) Date: Feb. 11, 2016

(87) PCT Pub. No.: WO2015/022290
PCT Pub. Date: Feb. 19, 2015

(65) Prior Publication Data
US 2016/0194441 A1 Jul. 7, 2016

(30) Foreign Application Priority Data
Aug. 12, 2013 (EP) .................................. 13382327

(51) Int. Cl.
C08G 64/34 (2006.01)
C08G 65/26 (2006.01)

(52) U.S. Cl.
CPC ......... C08G 64/34 (2013.01); C08G 65/2603 (2013.01); C08G 65/2663 (2013.01)

(58) Field of Classification Search
CPC .................................................... C08G 64/34
See application file for complete search history.

(56) References Cited

U.S. PATENT DOCUMENTS

| | | |
|---|---|---|
| 3,404,109 A | 10/1968 | Milgrom |
| 3,427,256 A | 2/1969 | Milgrom |
| 3,427,334 A | 2/1969 | Belher |
| 3,941,849 A | 3/1976 | Johnston |
| 5,158,922 A | 10/1992 | Hinney et al. |
| 9,045,592 B2 * | 6/2015 | Gurtler ................ C08G 64/183 |
| 9,315,622 B2 * | 4/2016 | Hofmann ............. C08G 65/34 |
| 2003/0149232 A1 | 8/2003 | Hinz et al. |
| 2003/0149323 A1 | 8/2003 | Al-Zahrani et al. |
| 2012/0289732 A1 | 11/2012 | Gurtler et al. |
| 2013/0123532 A1 | 5/2013 | Gurtler et al. |
| 2013/0190462 A1 | 7/2013 | Wolf et al. |
| 2013/0211042 A1 | 8/2013 | Gurtler et al. |
| 2014/0256908 A1 | 9/2014 | Hofmann et al. |

FOREIGN PATENT DOCUMENTS

| | | | |
|---|---|---|---|
| CA | 2810559 | | 3/2012 |
| CA | 2814382 | | 4/2012 |
| CN | 101623656 | * | 1/2010 |
| EP | 2239291 | | 10/2010 |
| EP | 2441788 | | 4/2012 |
| EP | 2548908 | | 1/2013 |
| RU | 2 177 828 C2 | | 1/2002 |
| WO | WO 97/40086 | | 10/1997 |
| WO | WO 2011/089120 | | 7/2011 |
| WO | WO 2012/032028 | | 3/2012 |
| WO | WO 2012/156431 | | 11/2012 |

OTHER PUBLICATIONS

CN101623656—Machine-translation, 2019 (machine translation of foreign patent CN 101623656).*
Dharman et al., "Moderate route for the utilization of CO2-microwave induced copolymerization with cyclohexene oxide using highly efficient double metal cyanide complex catalysts based on $Zn_3[Co(CN)_6]$," Green Chem., vol. 10, p. 678-684 (2008).
International Search Report corresponding to International application No. PCT/EP2014/067158 dated Jan. 26, 2015.
Kim et al., "Aliphatic polycarbonate synthesis by copolymerization of carbon dioxide with epoxides over double metal cyanide catalysts prepared by using $ZnX_2$ (X=F, CI, Br, I)," Catalysis Today, vol. 111, p. 292-296 (2006).
Kim et al., "Biodegradable polycarbonate synthesis by copolymerization of carbon dioxide with epoxides using a heterogeneous zinc complex," Macromol. Symp., vol. 224, p. 181-191 (2005).
Lee et al., "Effect of complexing agents of double metal cyanide catalyst on the copolymenzations of cyclohexene oxide and carbon dioxide," Catalysis Today, vol. 148, p. 389-397 (2009).
IPRP and Written Opinion corresponding to International Application No. PCT/EP2014/067158 dated Feb. 16, 2016.

* cited by examiner

Primary Examiner — Sun Jae Yoo
(74) Attorney, Agent, or Firm — Jenkins, Wilson, Taylor & Hunt, P.A.

(57) ABSTRACT

The present invention relates to a process for the preparation of polyether carbonate polyols in the presence of a double metal cyanide catalysts that can be obtained by a process comprising (a) synthesizing a solid double metal cyanide catalyst in the presence of an organic complexing agent and a polyether polyol ligand; and (b) first washing the catalyst obtained in step a) with an aqueous solution comprising 90-100% by weight of water and 0-10% by weight of a polyether polyol ligand, to form a slurry, wherein the aqueous solution does not contain any organic complexing agent other than the polyether polyol ligand.

18 Claims, No Drawings

PROCESS FOR PREPARING POLYETHER CARBONATE POLYOLS

CROSS-REFERENCE TO RELATED APPLICATIONS

This application is filed under the provisions of 35 U.S.C. § 371 and claims the priority of International Patent Application No. PCT/EP2014/067158 filed on Aug. 11, 2014, and of European Patent Application No. 13382327.8 filed on Aug. 12, 2013. The disclosures of the foregoing international patent application and European patent application are incorporated by reference herein in their respective entireties.

FIELD OF THE INVENTION

The present invention relates to a process for the preparation of polyether carbonate polyols in the presence of a double metal cyanide catalyst that can be obtained by a process comprising (a) synthesizing a solid double metal cyanide catalyst in the presence of an organic complexing agent and a polyether polyol ligand; and (b) first washing the catalyst obtained in step a) with an aqueous solution comprising 90-100% by weight of water and 0-10% by weight of a polyether polyol ligand, to form a slurry, wherein the aqueous solution does not contain any organic complexing agent other than the polyether polyol ligand.

BACKGROUND OF THE INVENTION

Double metal cyanide (DMC) complexes were discovered more than forty years ago by researchers from the General Tyre and Rubber Company (U.S. Pat. Nos. 3,404,109; 3,427,256; 3,427,334; 3,941,849) and are well-known catalysts for the polymerization of alkylene oxides and the copolymerization of alkylene oxides with carbon dioxide.

DMC catalysts obtained in the presence of an alcohol (TBA) and polyether polyols as complexing agents have been found very efficient in the copolymerization of alkylene oxides with $CO_2$.

The effect of the metal salt used in the preparation of the DMC catalyst on the efficacy of $CO_2$ fixation was studied by Kim et al. (Catalysis Today 2006, 111, 292-296) in the copolymerization of various epoxides catalyzed by DMC complexes obtained using TBA and PTMEG as complexing agents.

The article Green Chemistry 2008, 10, 678-684 describes the microwave-induced copolymerization of cyclohexene oxide with $CO_2$ in the presence of DMC catalysts having TBA and polyethers as complexing agents. The use of microwaves is reported to give a polycarbonate with a higher $CO_2$ incorporation. However, the need of microwave irradiation makes this process not very attractive from an industrial viewpoint.

The article by Kim et al. in Catalysis Today 2009, 224, 181-191, studies the effect of several polyethers as complexing agents of the DMC catalyst on the copolymerization of cyclohexene oxide with $CO_2$.

WO 2012/032028 discloses the copolymerizaton of alkylene oxides and carbon dioxide by means of DMC catalysts having an unsaturated alcohol as a complexing agent. These complexing agents are disclosed to improve the incorporation of carbon dioxide into the polymer.

WO 2011/089120 discloses a process for the catalytic copolymerization of alkylene oxides with carbon dioxide that leads to a high content of incorporated $CO_2$ in the polycarbonate. In this process the DMC catalyst is activated by bringing portions of the alkylene oxide into contact with the catalytic system before the copolymerization reaction.

EP 2548908 discloses the preparation of polyether carbonate polyols from alkylene oxides and carbon dioxide with a double metal cyanide (DMC) catalyst, where the DMC catalyst comprises at least one complex forming components comprising polycarbonate diol, polyethercarbonate polyol, polyethylene glycoldiol or poly(tetramethylene etherdiol). In this process, the DMC catalyst is obtained by a process in which the washing step is carried on with an aqueous solution of an organic complex and at least one of the complex forming components mentioned above.

US 2013/123532 relates to a process for the preparation of polyether carbonate polyols from alkylene oxides and carbon dioxide by means of a double metal cyanide catalyst (DMC). The presence of a certain amount of an alkaline metal hydroxide, metal carbonate and/or metal oxide in the cyanide-free metal salt, the metal cyanide salt or both the mentioned salts used for the preparation of the DMC catalyst is disclosed to improve selectivity (that is, reduce the ratio cyclic carbonate/linear polyether carbonate) and increase the catalyst activity towards $CO_2$. In this process, the DMC catalyst is obtained by a process in which the washing step is carried on with an aqueous solution of an organic complex ligand.

EP 2441788 discloses the production of polyether carbonate polyols from alkylene oxides and carbon dioxide by means of a double metal cyanide (DMC) catalyst, where the reaction is carried out in a tubular reactor.

US 2003/149323 discloses a method for the production of polyether carbonate polyols from alkylene oxides and carbon dioxide by means of a multimetal cyanide compound having a crystalline structure and a content of platelet-shaped particles of at least 30% by weight.

US 2013/0190462 relates to a process for the preparation of polyether carbonate polyols by catalytic copolymerization of carbon dioxide with alkylene oxides with the aid of double metal cyanide (DMC) catalysts and in the presence of metal salts.

Though the effect of different modifications within the catalytic system on the content of incorporated $CO_2$ in the resulting polymer has been evaluated, the influence of the washing step during the preparation of the DMC catalyst has not been reported.

In spite of the different procedures for preparing polyether carbonate polyols disclosed in the prior art, improved processes are still needed. In particular, processes that lead to polyether carbonate polyols with a high content of carbon dioxide, even under mild reaction conditions, and/or improved selectivity of the linear to cyclic product are desirable.

WO 2012/156431 discloses DMC catalysts which are prepared by carrying out a first washing step with an aqueous solution not containing any complexing agent other than the polyether ligand. These catalysts were found highly active in the polymerization of alkylene oxides to obtain polyols. However, this document contains no indication that these catalysts can also be used in the copolymerization of alkylene oxides with carbon dioxide.

BRIEF DESCRIPTION OF THE INVENTION

The inventors have surprisingly found that the use of double metal cyanide (DMC) catalysts as those described in WO 2012/156431 provides an improved process for the preparation of polyether carbonate polyols. In particular, the present invention provides a convenient and effective method of preparing polyether carbonate polyols with a high content of carbon dioxide incorporated in the polymer backbone. Furthermore, this high content of incorporated $CO_2$ can be achieved even when performing the polymer synthesis under mild conditions.

Though these DMC catalysts are reported in WO 2012/156431 as highly active in the self-polimerization of alkylene oxides, the inventors have surprisingly found that they allow the incorporation of high contents of $CO_2$ when the alkylene oxides are copolymerized with carbon dioxide.

The process of the invention leads to polyether carbonate polyols with a higher content of incorporated $CO_2$ than other related processes of the prior art in which the DMC catalyst is first washed with a solution comprising TBA. A lower ratio of the cyclic carbonate formed as a sub-product in the reaction is also observed in the process of the invention (see comparative experiments, Table 1).

Therefore, in a first aspect the invention refers to a process for the preparation of polyether carbonate polyols comprising copolymerizing one or more H-functional initiator substances, one or more alkylene oxides and carbon dioxide in the presence of a double metal cyanide catalyst, wherein the double metal cyanide catalyst is obtainable by a process comprising:
  a) synthesizing a solid double metal cyanide catalyst in the presence of an organic complexing agent and a polyether polyol ligand; and
  b) first washing the catalyst obtained in step a) with an aqueous solution comprising:
    90-100% by weight of water; and
    0-10% by weight of a polyether polyol ligand,
  to form a slurry, wherein the aqueous solution does not contain any organic complexing agent other than the polyether polyol ligand.

Preferably, the process by which the DMC catalyst can be obtained further comprises:
  c) isolating the catalyst from the slurry obtained in step b); and
  d) washing the solid catalyst obtained in step c) with a solution comprising:
    90-100% by weight of an organic complexing agent, and
    0-10% by weight of a polyether polyol ligand.

In the process by which the DMC catalyst can be obtained, it is advantageous to combine the use of the particular aqueous solution in the above mentioned washing step (step b) with:
  the use of an excess amount of an organic complexing agent in a subsequent washing step (step d)
  and/or
  the use of an excess amount of an organic complexing agent in the synthesis of the DMC catalyst (step a).

It is preferred within the present invention that the polyether polyol ligand used in the preparation of the DMC catalyst has been obtained by acidic catalysis. More preferably, said polyether polyol ligand has a molecular weight lower than 2000 and has been obtained by acidic catalysis.

It is also advantageous to use a polyether polyol synthesized by acidic catalysis as the initiator substance in the copolymerization reaction.

In another aspect, the invention is directed to the use of a DMC catalyst obtainable by the process defined herein, in the preparation of polyether carbonate polyols.

In a further aspect, the invention refers to a polyether carbonate polyol obtainable by the process of the invention.

Finally, another aspect of the present invention relates to the use of a polyether carbonate polyol as defined above for the manufacture of polyurethane.

DETAILED DESCRIPTION OF THE INVENTION

The process of the invention provides polyether carbonate polyols with a higher content of incorporated carbon dioxide than other related processes of the prior art, even when milder reaction conditions are used (see comparative Examples in Table I). Accordingly, the invention provides a process for preparing polyether carbonate polyols with a high content of incorporated $CO_2$.

Therefore, in a first aspect the invention is directed to a process for the preparation of polyether carbonate polyols comprising copolymerizing one or more H-functional initiator substances, one or more alkylene oxides and carbon dioxide in the presence of a double metal cyanide catalyst, wherein the double metal cyanide catalyst is obtainable by a process comprising:
  a) synthesizing a solid double metal cyanide catalyst in the presence of an organic complexing agent and a polyether polyol ligand; and
  b) first washing the catalyst obtained in step a) with an aqueous solution comprising:
    90-100% by weight of water; and
    0-10% by weight of a polyether polyol ligand,
  to form a slurry, wherein the aqueous solution does not contain any organic complexing agent other than the polyether polyol ligand.

DMC Catalyst

The DMC catalyst used in the process of the present invention can be obtained by a process comprising:
  a) synthesizing a solid double metal cyanide catalyst in the presence of an organic complexing agent and a polyether polyol ligand; and
  b) first washing the catalyst obtained in step a) with an aqueous solution comprising:
    90-100% by weight of water; and
    0-10% by weight of a polyether polyol ligand,
  to form a slurry, wherein the aqueous solution does not contain any organic complexing agent other than the polyether polyol ligand.

In a particular embodiment, said process further comprises:
  c) isolating the catalyst from the slurry obtained in step b); and
  d) washing the solid catalyst obtained in step c) with a solution comprising:
    90-100% by weight of an organic complexing agent, and
    0-10% by weight of a polyether polyol ligand.

Step a)

This step can be performed by any method known in the prior art for the synthesis of a DMC catalyst. In a particular embodiment, this step can be carried out by reacting, in an aqueous solution, a water-soluble metal salt (in excess) and a water-soluble metal cyanide salt in the presence of a polyether polyol ligand and an organic complexing agent.

In a preferred embodiment, aqueous solutions of a water-soluble metal salt and a water-soluble metal cyanide salt are first reacted in the presence of the organic complexing agent using efficient mixing to produce a catalyst slurry. The metal salt is used in excess; preferably the molar ratio of metal salt to metal cyanide salt is between 2:1 and 50:1, more preferably between 10:1 and 40:1. This catalyst slurry contains the reaction product of the metal salt and the metal cyanide salt, which is a double metal cyanide compound. Also present are excess metal salt, water, and organic complexing agent, all of which are incorporated to some extent in the catalyst structure. In another preferred embodiment, the mixture of the aqueous solution containing the water-soluble metal salt and the aqueous solution containing the water-soluble metal cyanide salt takes place at a temperature ranging from 30 to 70° C., more preferably from 40 to 60° C., even more preferably at about 50° C.

The water-soluble metal salt preferably has the general formula $MA_n$, wherein:

M is a cation selected form the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III). Preferably, M is a cation selected from Zn(II), Fe(II), Ni(II), Mn(II) and Co(II);

A is an anion selected from the group consisting of halide, hydroxide, sulfate, carbonate, vanadate, cyanide, oxalate, thiocyanate, isocyanate, isothiocyanate, carboxylate and nitrate. Preferably, A is a cation selected from halide; and n is 1, 2 or 3 and satisfies the valency state of M.

Examples of suitable metal salts include, but are not limited to, zinc chloride, zinc bromide, zinc acetate, zinc acetonylacetonate, zinc benzoate, zinc nitrate, iron(II) sulfate, iron(II) bromide, cobalt(II) chloride, cobalt(II) thiocyanate, nickel(II) formate, nickel(II) nitrate and the like and mixtures thereof. In a particular embodiment, the water-soluble metal salt is zinc chloride.

The water-soluble metal cyanide salts preferably have the formula $D_x[E_y(CN)_6]$, wherein:

D is an alkali metal ion or alkaline earth metal ion;

E is a cation selected from the group consisting of Co(II), Co(III), Fe(II), Fe(III), Mn(II), Mn(III), Cr(II), Cr(III), Ni(II), Ir(III), Rh(III), Ru(II), V(IV) and V(V). Preferably, E is selected from Co(II), Fe(II), Ni(II), Co(III) and Fe(III); and x and y are integers greater than or equal to 1, the sum of the charges of x and y balances the charge of the cyanide (CN) group.

Suitable water-soluble metal cyanide salts include, but are not limited to, potassium hexacyanocobaltate (III), potassium hexacyanoferrate (II), potassium hexacyanoferrate (III), calcium hexacyanocobaltate (III), lithium hexacyanocobaltate (III), and the like. In a particular embodiment, the metal cyanide salt is potassium hexacyanocobaltate (III).

The organic complexing agent can be included with either or both of the aqueous salt solutions, or it can be added to the catalyst slurry immediately following precipitation of the DMC compound. It is generally preferred to pre-mix the organic complexing agent with either aqueous solution before combining the reactants. Usually, an excess amount of the complexing agent is used. Typically, the molar ratio of complexing agent to metal cyanide salt is between 10:1 and 100:1, preferably between 10:1 and 50:1, more preferably between 20:1 and 40:1.

Generally, the complexing agent must be relatively soluble in water. Suitable organic complexing agents are those commonly known in the art, for example in U.S. Pat. No. 5,158,922. Preferred organic complexing agents are water-soluble heteroatom-containing organic compounds that can complex with the double metal cyanide compound. According to the present invention, the organic complexing agent is not a polyether polyol. More preferably, the organic complexing agents are water-soluble heteroatom-containing compounds selected from monoalcohols, aldehydes, ketones, ethers, esters, amides, ureas, nitriles, sulfides and mixtures thereof. Preferred organic complexing agents are water-soluble aliphatic alcohols, preferably $C_1$-$C_6$ aliphatic alcohols, selected from the group consisting of ethanol, isopropyl alcohol, n-butyl alcohol, iso-butyl alcohol, sec-butyl alcohol and tert-butyl alcohol. Tert-butyl alcohol (TBA) is particularly preferred.

Preferably, the aqueous metal salt and metal cyanide salt solutions (or their DMC reaction product) are efficiently mixed with the organic complexing agent. A stirrer can be conveniently used to achieve efficient mixing.

Examples of double metal cyanide compounds resulting from this reaction include, for example, zinc hexacyanocobaltate (III), zinc hexacyanoferrate (III), nickel hexacyanoferrate (II), cobalt hexacyanocobaltate (III) and the like. Zinc hexacyanocobaltate (III) is preferred.

The catalyst slurry produced after the mixing of the aqueous solutions in the presence of the organic complexing agent is then combined with a polyether polyol ligand. This step is preferably performed using a stirrer so that an efficient mixture of the catalyst slurry and the polyether polyol takes place.

This mixture is preferably performed at a temperature ranging from 30 to 70° C., more preferably from 40 to 60° C., even more preferably at about 50° C.

Suitable polyether polyols include those produced by ring-opening polymerization of cyclic ethers, and include epoxide polymers, oxetane polymers, tetrahydrofuran polymers and the like. Any method of catalysis can be used to make the polyethers. The polyethers can have any desired end groups, including, for example, hydroxyl, amine, ester, ether or the like. Preferred polyethers are polyether polyols having average hydroxyl functionalities from about 2 to about 8. Also preferred are polyether polyols having a number average molecular weight lower than 2000, more preferably between 200 and 1000, even more preferably between 300 and 800. These are usually made by polymerizing epoxides in the presence of active hydrogen-containing initiators and basic, acidic or organometallic catalysts (including DMC catalysts).

Useful polyether polyols include poly(oxypropylene) polyols, ethylene oxide-capped poly(oxypropylene) polyols, mixed ethylene oxide-propylene oxide polyols, butylenes oxide polymers, butylenes oxide copolymers with ethylene oxide and/or propylene oxide, polytetra methylene ether glycols and the like. Most preferred are poly(oxypropylene) polyols, particularly diols and triols having number average molecular weights lower than 2000, more preferably between 200 and 1000, even more preferably between 300 and 800.

More preferably, the polyether polyol used in the preparation of the DMC catalyst has been synthesized by acidic catalysis, i.e. by polymerizing an epoxide in the presence of active hydrogen-containing initiator and acidic catalysts. Examples of suitable acidic catalysts include Lewis acids such as $BF_3$, $SbF_5$, $Y(CF_3SO_3)_3$, or Brönsted acids such as $CF_3SO_3H$, $HBF_4$, $HPF_6$, $HSbF_6$.

In a particular embodiment, the polyether polyol ligand is a poly(oxypropylene) polyol with a number average molecular weight between 200 and 1000, preferably between 300 and 800, obtained by basic catalysis.

In another embodiment, the polyether polyol ligand is a poly(oxypropylene) polyol with a number average molecular weight between 200 and 1000, preferably between 300 and 800, obtained by acidic catalysis.

Using a polyether polyol obtained by acidic catalysis in the preparation of the DMC catalyst is preferred. Once the polyether polyol has been combined with the double metal cyanide compound, a polyether polyol-containing solid catalyst is isolated from the catalyst slurry. This is accomplished by any convenient means, such as filtration, centrifugation or the like.

In a particular embodiment, enough reactants are used to give a solid DMC catalyst that contains:
- 30-80% by weight of the double metal cyanide compound;
- 1-10% by weight of water;
- 1-30% by weight of the organic complexing agent; and
- 1-30% by weight of the polyether polyol ligand.

Preferably, the total amount of the organic complexing agent and the polyether polyol is from 5% to 60% by weight with respect to the total weight of the catalyst, more preferably from 10% to 50% by weight, even more preferably from 15% to 40% by weight.

Step b)

The isolated polyether polyol-containing solid catalyst is then first washed with an aqueous solution comprising 90-100% by weight of water and 0-10% by weight of a polyether polyol. This aqueous solution is absent of any organic complexing agent as those mentioned above. No other washing step is performed before this first washing step once the isolated solid DMC catalyst has been obtained in step a).

The polyether polyol used in step b) is as defined above for step a).

Percentages by weight of the components in the aqueous solution are based on the total weight of said aqueous solution.

It has been surprisingly found that the particular composition of the aqueous solution used in this washing step leads to a double metal cyanide catalyst that provides an improved process for preparing polyether carbonate polyols. As shown in the examples of the present invention, the content of incorporated carbon dioxide is higher than that obtained with a DMC catalyst obtained by washing with an aqueous solution comprising an organic complexing agent (such as tert-butyl alcohol) and a polyether polyol (comparative Examples 5-6).

Preferably, the amount of polyether polyol ligand in the aqueous solution in step b) is lower than 5% by weight with respect to the total weight of the aqueous solution. According to a further particular embodiment the amount of polyether polyol ligand in the aqueous solution in step b) is lower than 4% by weight with respect to the total weight of solution, preferably lower than 3%. According to a further embodiment, the amount of polyether polyol ligand in the aqueous solution in step b) is between 0.05% and 10% by weight with respect to the total weight of solution, preferably between 0.1% and 2%, more preferably between 0.3% and 1.8%. In a further particular embodiment, the amount of polyether polyol ligand in the aqueous solution in step b) is 0% by weight.

In step b) the water and the polyether polyol ligand can be brought into contact with the catalyst obtained in step a) simultaneously or consecutively. That is, the aqueous solution in step b) can already contain both the water and the polyether polyol ligand when brought into contact with the catalyst obtained in step a) ("simultaneous bringing into contact") or the catalyst obtained in step a) can be first brought into contact with one of the individual components (the water or the polyether polyol ligand) and the resulting mixture then brought into contact with the other individual component ("consecutive bringing into contact"). In a particular embodiment, the water and the polyether polyol ligand are brought into contact with the catalyst obtained in step a) consecutively.

In a preferred embodiment, the catalyst obtained in step a) is first brought into contact with water and then brought into contact with the polyether polyol ligand which is preferably in a 0.1 to 5%, more preferably in 0.1 to 3%, by weight with respect to the total weight of the aqueous solution.

This washing step is generally accomplished by reslurrying the catalyst in the aqueous solution followed by a catalyst isolation step using any convenient means, such as filtration.

It has also been particularly advantageous to use this aqueous solution in the washing step b) in combination with an excess amount of the organic complexing agent in step a) and/or d).

Step d)

Although a single washing step suffices, it is preferred to wash the catalyst more than once. In a preferred embodiment, the subsequent wash is non-aqueous and includes the reslurry of the double metal cyanide catalyst in an organic complexing agent or in a mixture of the organic complexing agent and the polyether polyol used in the previous washing step. More preferably, the double metal cyanide catalyst is washed with a solution comprising 90-100% by weight of the organic complexing agent and 0-10% by weight of the polyether polyol.

The polyether polyol used in step d) is as defined above for step a).

Percentages by weight of the components in the solution are based on the total weight of said solution.

Preferably, the amount of polyether polyol in the solution in step d) is lower than 5% by weight with respect to the total weight of solution. According to a further particular embodiment the amount of polyether polyol ligand is lower than 4% by weight with respect to the total weight of solution, preferably lower than 3%. According to a further embodiment, the amount of polyether polyol in step d) is between 0.05% and 5% by weight with respect to the total weight of solution, preferably between 0.1% and 2%, more preferably between 0.3% and 1.8%.

The organic complexing agent is preferably tert-butyl alcohol. The polyether polyol is preferably a poly(oxypropylene)polyol, more preferably a poly(oxypropylene)polyol having a molecular weight lower than 2000 Da, more preferably from 200 to 1000 Da or from 300 to 800 Da, and/or which has been synthesized by acidic catalysis.

Typically, the molar ratio of complexing agent to metal cyanide salt is between 10:1 and 200:1, preferably between 20:1 and 150:1, more preferably between 50:1 and 150:1.

In step d) the organic complexing agent and the polyether polyol can be brought into contact with the solid catalyst obtained in step c) simultaneously or consecutively. In a particular embodiment, they are brought into contact with the solid catalyst obtained in step c) consecutively. Preferably, the catalyst obtained in step c) is first brought into contact with the organic complexing agent and then brought into contact with the polyether polyol.

After the catalyst has been washed, it is usually preferred to dry it under vacuum until the catalyst reaches a constant weight. The catalyst can be dried at temperatures within the range of about 50° C. to 120° C., more preferably from 60° C. to 110° C., even more preferably from 90° C. to 110° C. The dry catalyst can be crushed to yield a highly active catalyst in powder form appropriate for use in the co-polymerization process of the invention.

In a particular embodiment, the double metal cyanide compound is zinc hexacyanocobaltate (III), the organic complexing agent is tert-butyl alcohol and the polyether polyol is a poly(oxypropylene) polyol. Preferably the polyether polyol is a poly(oxypropylene)polyol, more preferably a poly(oxypropylene)polyol having a molecular weight lower than 2000 Da, more preferably from 200 to 1000 Da or from 300 to 800 Da, and/or which has been synthesized by acidic catalysis.

In a particular embodiment, the catalyst obtainable by the above process is also characterized by comprising:
- at least one double metal cyanide compound;
- at least one organic complexing agent; and
- at least one polyether polyol ligand having a molecular weight lower than 2000 Da.

In a particular embodiment, the double metal cyanide compound is zinc hexacyanocobaltate (III), the organic complexing agent is tert-butyl alcohol and the polyether polyol has a molecular weight lower than 2000 Da. Most preferred the polyether polyol is a poly(oxypropylene) polyol, particularly a diol or triol having number average molecular weight between 200 and 1000 Da, more preferably between 300 and 800 Da.

In a particular embodiment, the organic complexing agent is tert-butyl alcohol and the polyether polyol has been synthesized by acidic catalysis. Preferably, the organic complexing agent is tert-butyl alcohol and the polyether polyol has a molecular weight lower than 2000 Da, preferably between 200 and 1000, more preferably between 300 and 800 Da, and has been synthesized by acidic catalysis.

In another embodiment, the organic complexing agent is tert-butyl alcohol and the polyether polyol has been synthesized by basic catalysis. Preferably, the organic complexing agent is tert-butyl alcohol and the polyether polyol has a molecular weight lower than 2000 Da, preferably between 200 and 1000, more preferably between 300 and 800 Da, and has been synthesized by basic catalysis.

In a particular embodiment, the double metal cyanide catalyst obtainable by the above process comprises:
- 30-80% by weight of the double metal cyanide compound;
- 1-10% by weight of water;
- 1-30% by weight of the organic complexing agent; and
- 1-30% by weight of the polyether polyol ligand.

Preferably, the total amount of the organic complexing agent and the polyether polyol is from 5% to 60% by weight with respect to the total weight of the catalyst, more preferably from 10% to 50% by weight, even more preferably from 15% to 40% by weight.

In a particular embodiment, the DMC catalyst used in the process of the invention has been prepared according to the process as defined above.

Polyether Carbonate Polyol Synthesis

The DMC catalyst obtainable by the above process has been found particularly useful for the preparation of polyether carbonate polyols.

Therefore, in an aspect the invention refers to a process for the preparation of polyether carbonate polyols comprising copolymerizing one or more H-functional initiator substances, one or more alkylene oxides and carbon dioxide in the presence of a double metal cyanide catalyst obtainable as defined above.

Typically, alkylene oxides having from 2 to 24 carbon atoms can be used in the process of the invention. Examples of said alkylene oxides include, among others, one or more compounds selected from the group consisting of optionally substituted ethylene oxide, propylene oxide, butene oxides, pentene oxides, hexene oxides, heptene oxides, octene oxides, nonene oxides, decene oxide, undecene oxides, dodecene oxides, cyclopentene oxide, cyclohexane oxide, cycloheptene oxide, cyclooctene oxide and styrene oxide. Substituted alkylene oxides preferably refer to alkylene oxides substituted with a $C_1$-$C_6$ alkyl group, preferably methyl or ethyl. Preferred alkylene oxides are ethylene oxide, propylene oxide, butene oxide, styrene oxide and mixtures thereof. In a particular embodiment, the alkylene oxide is propylene oxide.

The term "H-functional initiator substance" refers to a compound having H atoms active for the alkoxylation, such as, for example, alcohols, primary or secondary amines, or carboxylic acids. Suitable H-functional initiator substances include one or more compounds selected from the group consisting of mono- or poly-hydric alcohols, polyvalent amines, polyvalent thiols, aminoalcohols, thioalcohols, hydroxy esters, polyether polyols, polyester polyols, polyester ether polyols, polyether carbonate polyols, polycarbonate polyols, polycarbonates, polyethyleneimines, polyether amines, polytetrahydrofurans, polytetrahydrofuranamines, polyether thiols, polyacrylate polyols, castor oil, the mono- or di-glyceride of ricinoleic acid, monoglycerides of fatty acids, chemically modified mono-, di- and/or tri-glycerides of fatty acids, and $C_1$-$C_{24}$-alkyl fatty acid esters that contain on average at least 2 OH groups per molecule.

In a particular embodiment the H-functional initiator substance is a polyether polyol, preferably having a molecular weight from 100 to 4000 Da. Suitable polyether polyols include poly(oxypropylene) polyols, ethylene oxide-capped poly(oxypropylene) polyols, mixed ethylene oxide-propylene oxide polyols, butylenes oxide polymers, butylenes oxide copolymers with ethylene oxide and/or propylene oxide, polytetra methylene ether glycols and the like. Most preferred are poly(oxypropylene) polyols, particularly having from two to eight hydroxyl groups, more preferably diols and triols, having number average molecular weights lower than 2000 Da, more preferably between 200 and 1000 Da, even more preferably between 300 and 800 Da.

More preferably, the polyether polyol used as the H-functional initiator substance has been synthesized by acidic catalysis, i.e. by polymerizing an epoxide in the presence of active hydrogen-containing initiator and acidic catalysts. Examples of suitable acidic catalysts include Lewis acids such as $BF_3$, $SbF_5$, $Y(CF_3SO_3)_3$, or Brönsted acids such as $CF_3SO_3H$, $HBF_4$, $HPF_6$, $HSbF_6$.

In a particular embodiment, the H-functional initiator substance is a polyether polyol that has been synthesized by acidic catalysis. Preferably, it is a polyether polyol that has been synthesized by acidic catalysis and has a number average molecular weight lower than 2000 Da, preferably between 200 and 1000 Da and more preferably between 300 and 800 Da.

In an embodiment, the H-functional initiator substance is the same polyether polyol as the one used in the synthesis of the DMC catalyst.

The process for the preparation of polyether carbonate polyols of the present invention can be carried out continuously, semi-batch-wise or discontinuously.

In a particular embodiment, at least one activation step of the DMC catalyst is performed before the copolymerization reaction. Preferably, one, two, three, four or five activation steps are performed, more preferably two, three or four activation steps.

Activation of the catalyst is achieved when a temperature peak ("hotspot") and/or pressure drop in the reactor occurs.

For the activation of the DMC catalyst, preferably a partial amount of alkylene oxide (based on the total amount of alkylene oxide used in the process of the invention) is added to a mixture comprising the DMC catalyst and the H-functional initiator substance(s) in the absence or in the presence of carbon dioxide.

In an embodiment, at least the first activation step is performed in the absence of carbon dioxide.

In an embodiment, the last activation step is performed in the presence of carbon dioxide. In a particular embodiment, all the activation steps are performed in the presence of carbon dioxide. In another embodiment, only the last activation step is performed in the presence of carbon dioxide.

In an embodiment of the present invention, two, three or four activation steps are performed before the copolymerization reaction by adding a partial amount of the alkylene oxide(s) to a mixture comprising the DMC catalyst and the H-functional initiator substance(s) and at least the first activation step is performed in the absence of carbon dioxide.

In another embodiment, two, three or four activation steps as defined above are performed and only the last activation step is performed in the presence of carbon dioxide. In an embodiment, two activation steps are performed, the first one in the absence of carbon dioxide and the second one in the presence of carbon dioxide. In another embodiment, three activation steps are performed, the two first ones in the absence of carbon dioxide and the third one in the presence of carbon dioxide. In another embodiment, four activation steps are performed, the three first ones in the absence of carbon dioxide and the fourth one in the presence of carbon dioxide.

In another embodiment, two, three or four activation steps as defined above are performed and all the activation steps are performed in the presence of carbon dioxide.

In an embodiment, three activation steps are performed, the first one in the absence of carbon dioxide and the second and third one in the presence of carbon dioxide. In another embodiment, four activation steps are performed, the first one in the absence of carbon dioxide and the three last ones in the presence of carbon dioxide.

In a particular embodiment, the process of the invention for the preparation of polyether carbonate polyols comprises the following steps:

(i) the one or more H-functional initiator substances is placed in a vessel and heating and/or vacuum is applied ("drying"), preferably with $N_2$ stripping, wherein the DMC catalyst is added to the one or more H-functional initiator substances before or after the drying;

In a particular embodiment, the DMC catalyst is added to the one or more H-functional initiator substances after the drying. Preferably, the one or more H-functional initiator substances is placed in a vessel and heating and vacuum are applied with $N_2$ stripping (drying), and the DMC catalyst is added to the one or more H-functional initiator substances after the drying.

Preferably, the temperature in step (i) is brought to from 50 to 200° C., more preferably from 80 to 160° C., even more preferably from 110 to 150° C. and/or the pressure is reduced to less than 500 mbar, preferably from 5 to 100 mbar.

In an embodiment, the H-functional initiator substance is subjected to a temperature from 110 to 150° C. and to a pressure from 5 to 100 mbar and the DMC catalyst is then added to said H-functional initiator substance. In another embodiment, the DMC catalyst is added to the H-functional initiator substance and the resulting mixture is subjected to a temperature from 110 to 150° C. and to a pressure from 5 to 100 mbar.

(ii) for activation
  (ii-1) in a first activation step, a first partial amount of alkylene oxide (based on the total amount of alkylene oxide used in the process of the invention) is added to the mixture resulting from step (i), in the presence of $CO_2$ or preferably in the absence of $CO_2$,
  (ii-2) in a second activation step, after the activation in the preceding step has been observed, a second partial amount of alkylene oxide (based on the total amount of alkylene oxide used in the process of the invention) is added to the mixture resulting from the preceding step, in the presence or in the absence of $CO_2$,
  (ii-3) optionally in a third activation step, after the activation in the preceding step has been observed, a third partial amount of alkylene oxide (based on the total amount of alkylene oxide used in the process of the invention) is added to the mixture resulting from the preceding step, in the presence or in the absence of $CO_2$,
  (ii-4) optionally in a further activation step, after the activation in the preceding step has been observed, a fourth partial amount of alkylene oxide (based on the total amount of alkylene oxide used in the process of the invention) is added to the mixture resulting from the preceding step in the presence of $CO_2$;

(iii) the rest of alkylene oxide and carbon dioxide are metered continuously into the mixture from step (ii) ("copolymerization"). The alkylene oxide used for the copolymerisation can be the same as or different from the alkylene oxide used in the activation or it can be a mixture of two or more alkylene oxides. In a particular embodiment, the alkylene oxide used for the copolymerisation is the same as the alkylene oxide used in the activation.

The addition of alkylene oxide and of the carbon dioxide can take place simultaneously or sequentially, it being possible for the entire amount of carbon dioxide to be added at once or in a metered manner over the reaction time. A metered addition of the carbon dioxide is preferred.

In a preferred embodiment, the partial amount of alkylene oxide used in the activation steps is in each step from 1.0 to 15.0 wt. %, preferably from 2.0 to 13.0 wt. %, particularly preferably from 2.5 to 10.0 wt. % based on the total amount of alkylene oxide used in the process of the invention. In another embodiment, the partial amount of alkylene oxide used in the activation steps is in each step from 1.0 to 15.0 wt. %, preferably from 2.0 to 15.0 wt. %, particularly preferably from 5.0 to 15.0 wt. % based on the amount of initiator present in the vessel when said partial amount of alkylene oxide is added.

Preferably, the activation steps are performed at a temperature of from 100 to 200° C., more preferably from 110 to 150° C. The copolymerization reaction is preferably performed at a temperature of from 70 to 120° C., more preferably from 80 to 110° C.

In an embodiment, the carbon dioxide pressure is between 1 and 100 bar, preferably from 2 to 60 bar, still more preferably from 5 to 50 bar.

In a particular embodiment, the DMC catalyst is used in the process of the invention in an amount of from 30 to 1000 ppm, preferably from 50 to 500 ppm, more preferably from 100 to 300 ppm, with respect to the total weight of the final polyether carbonate polyol.

In a particular embodiment, the DMC catalyst has been prepared by a process as defined herein. Therefore, in an embodiment the process of the invention comprises preparing a DMC catalyst as defined herein and bringing it into contact with one or more H-functional initiator substances, one or more alkylene oxides and carbon dioxide as defined herein.

The polyether carbonate polyols obtained according to the process of the present invention have a functionality of at least two, preferably from two to eight. The molecular weight of the polyether carbonate polyols obtained according to the process of the present invention have a molecular weight preferably from 500 to 20000 Da, more preferably from 1000 to 12000 Da. Preferably, the polyether carbonate polyols obtained according to the process of the present invention (referred to the whole polyether carbonate polyol chain) has from 1 to 50 wt %, from 5 to 50 wt %, from 1 to 40 wt % or from 5 to 40 wt %, of carbon dioxide. More preferably from 5 to 30 wt %, still more preferably from 5 to 15 wt %, based on the total weight of the final polyether carbonate polyol.

The use of the DMC catalyst of the invention in the co-polymerization of alkylene oxides and carbon dioxide allows the preparation of polyether carbonate polyols with a high content of incorporated carbon dioxide. Consequently, the invention also refers to a polyether carbonate polyol obtainable by the process of the invention.

The polyether carbonate polyol obtainable by the process according to the invention can be processed by reaction with di- and/or polyisocyanates to give polyurethanes, in particular flexible polyurethane foams. For polyurethane uses, polyether carbonate polyols which are based on an H-functional starter substance which has a functionality of at least 2 are preferably employed.

The following examples merely illustrate the invention. Those skilled in the art will recognize many variations that can be performed without altering the functioning of the invention.

EXAMPLES

Example 1

Preparation of Zinc Hexacyanocobaltate Catalyst Using TBA as Organic Complexing Agent and Polypropylene Glycol (PPG) Synthesized Under Basic Conditions (MWn 400) as Polyether Polyol (DMC Catalyst I)

DMC catalyst I was prepared following the procedure disclosed in comparative Example 2 in WO 2012/156431 as follows:

$1^{st}$ Step: Potassium hexacyanocobaltate (7.5 g) was dissolved in deionized water (100 ml) in a beaker (Solution A). Zinc chloride (75 g) and tert-butyl alcohol TBA (75 mL) were dissolved in deonized water (275 mL) in a second beaker (Solution B). Solution B was heated at a temperature of 50° C. Subsequently, solution A was slowly added for 30 minutes to the solution B while stirring at 400 rpm. The aqueous zinc chloride and TBA solution and the cobalt salt solution were combined using a stirrer to intimately and effectively mix both aqueous solutions. The mixture was held post-reacting for 30 minutes at the same temperature to form a slurry of zinc hexacyanocobaltate. A third solution (solution C) was prepared by dissolving a 400 mol. wt. diol (8 g, polypropylene glycol(PPG)) in deonized water (50 mL) and TBA (3 mL). Said diol was synthesized by basic catalysis following procedures widely known in the art. Solution C (the PPG/water/TBA mixture) was added to the aqueous slurry zinc hexacyanocobaltate for 5 minutes, and the product was stirred for 10 additional minutes. The mixture was filtered under pressure to isolate the solid.

$2^{nd}$ Step: The solid cake was reslurried in water (208 mL) for 30 minutes at a temperature of 50° C. and subsequently, additional 400 mol. wt diol PPG (2 g) was added. The mixture was homogenized by stirring for 10 minutes and filtered.

$3^{rd}$ Step: The solid cake obtained after the second step was reslurried in TBA (280 mL) for 30 minutes at a temperature of 50° C. and subsequently, additional 400 mol. wt diol PPG (1 g) was added. The mixture was homogenized by stirring for 5 minutes and filtered. The resulting solid catalyst was dried under vacuum at 100° C. and 10 mbar to constant weight.

The DMC catalyst having a polyether polyol synthesized under acidic catalysis can be prepared following a similar process, as shown in Example 3 in WO 2012/156431.

Comparative Example 2

Preparation of DMC Catalyst Using TBA in the First Washing Step (DMC Catalyst II)

In order to analyze the effect of the first washing step, a DMC catalyst was prepared following the procedure disclosed in comparative Example 4 in WO 2012/156431. This washing step ($2^{nd}$ step) is carried out using an aqueous composition comprising the polyether polyol and TBA.

Example 3

Acidic Catalysis Synthesis of Propoxylated Glycerol (700 Mol. Wt Triol)

Glycerin (130 g) was charged into the reactor, purged with $N_2$ and dehydrated at 130° C. (until $H_2O$<500 ppm). Then, glycerin was stabilized at 50° C. and the catalyst $HBF_4$ (2 g, 2000 ppm) was added to the reactor. Propylene oxide feeding (868 g) was started slowly at atmospheric pressure, controlling the flow rate in order to control the temperature (50° C.) and pressure (below 1 bar). As the reaction proceeded it slowed down, increasing the pressure (pressure was controlled not to exceed 3 bar). When the reaction was finished, the mixture was left for 2 h (post-reaction). Subsequently, vacuum was applied for 1 h at 50° C. with $N_2$ stripping in order to remove residual monomers. Then, the reactor was cooled to 30° C. and the product discharged. The product obtained has the following properties: IOH=240±10 mg KOH/g; Humidity<500 ppm; Acidity<0.1 mg KOH/g; Viscosity<400 cps.

Examples 4-12

Synthesis of Polyether Carbonate Polyols

General Procedure

A two-liter stainless steel reactor was charged with 200 g of the initiator substance. The reactor was heated to 130° C. while vacuum was applied with $N_2$ stripping. After reaching the desired temperature, vacuum was continued for 30 min more. When the initiator was dried ($H_2O$<100 ppm), the DMC catalyst (200 ppm) was added.

A first portion of propylene oxide was added to the reactor for the catalyst activation. A waiting time was observed until a temperature peak (hotspot) and a pressure drop occurs. Optionally, a second portion of propylene oxide was added in the absence of $CO_2$ and a waiting time was observed until activation occurred. Optionally, a third portion of propylene oxide was added in the absence of $CO_2$ and a waiting time was observed until activation occurred. Carbon dioxide was then introduced into the reactor until the desired pressure and a further portion of propylene oxide was added. After catalyst activation was observed, the remaining propylene oxide needed for a polyether carbonate triol Mw 3000, was slowly and continuously pumped into the reactor. When the carbon dioxide pressure decreased a certain value, further $CO_2$ was admitted.

When co-feeding of propylene oxide and carbon dioxide was started, temperature was decreased to 105° C. or 90° C. When propylene oxide addition was completed, the mixture was stirred at said temperature for 60 min Finally, residual monomers were removed under vacuum with $N_2$ stripping for 1 h at 90° C. The reactor was cooled and the product discharged.

The amount of propylene oxide added in each activation step was:

|  | PO (g) | | | | |
| --- | --- | --- | --- | --- | --- |
|  | $1^{st}$ activation | $2^{nd}$ activation | $3^{rd}$ activation | last activation (with $CO_2$) | PO remainder |
| Ex. 4-6 | 30 | 25 | 20 | 60 | 465 |
| Ex. 7-9 | 30 | 20 | — | 40 | 510 |
| Ex. 10-12 | 30 | — | — | 40 | 530 |

The amount by weight (in wt %) of $CO_2$ incorporated in the resulting polyether carbonate polyol, and the ratio of propylene carbonate to polyether carbonate polyol, were determined by means of $^1$H-NMR (Bruker AV III HD 500, 500 MHz, pulse program zg30, waiting time d1: 1 s, 120 scans). The sample was dissolved in deuterated chloroform. The relevant resonances in the $^1$H-NMR (based on TMS=0 ppm) are as follows: Cyclic carbonate=1.50 ppm (3H); Polyether carbonate polyol=1.35-1.25 ppm (3H); Polyether polyol: 1.25-1.05 ppm (3H).

The amount by weight (in wt. %) of polymer bonded carbonate (CP) in the polyether carbonate polyol was calculated according to formula (I):

$$CP=F(1.35\text{-}1.25)\times 102\times 100/Np \qquad (I)$$

wherein:

F(1.35-1.25) is the resonance area at 1.35-1.25 ppm for polyether carbonate polyol (corresponds to 3 H atoms);

the value for Np ("denominator" Np) was calculated according to formula (II):

$$Np=F(1.35\text{-}1.25)\times 102+F(1.25\text{-}1.05)\times 58 \qquad (II)$$

being F(1.25-1.05) the resonance area at 1.25-1.05 ppm for polyether polyol (corresponds to 3 H atoms).

The factor 102 results from the sum of the molar masses of $CO_2$ (molar mass 44 g/mol) and of propylene oxide (molar mass 58 g/mol) and the factor 58 results from the molar mass of propylene oxide.

The amount by weight (in wt. %) of $CO_2$ in polymer was calculated according to formula (III)

$$\% \; CO_2 \text{ in polymer}=CP\times 44/102 \qquad (III).$$

The amount by weight (wt. %) of cyclic carbonate (CC') in the reaction mixture was calculated according to formula (IV):

$$CC'=F(1.50)\times 102\times 100/N \qquad (IV)$$

wherein:

F(1.50) is the resonance area at 1.50 ppm for cyclic carbonate (corresponds to 3 H atoms);

the value for N ("denominator" N) was calculated according to formula (V)

$$N=F(1.35\text{-}1.25)\times 102+F(1.50)\times 102+F(1.25\text{-}1.05)\times 58 \qquad (V)$$

TABLE I

| Example | DMC catalyst | Initiator[a] | No. of activations | Temp (° C.) | $CO_2$ pressure (bar) | PO flow (g/min) | $CO_2$ in final polyol (wt %)[b] | cyclic carbonate (wt %) |
| --- | --- | --- | --- | --- | --- | --- | --- | --- |
| 4 | I | acidic | 4 | 105 | 25 | 3 | 12.1 | 6.4 |
| 5 (comp) | II | acidic | 4 | 105 | 25 | 3 | 11.3 | 9.0 |
| 6 (comp) | II | basic | 4 | 105 | 25 | 3 | 10.0 | 7.2 |
| 7 | I | acidic | 3 | 90 | 15 | 3 | 13.5 | 4.8 |
| 8 | I | acidic | 3 | 90 | 25 | 3 | 15.2 | 7.1 |
| 9 | I | basic | 3 | 90 | 25 | 3 | 14.2 | 6.2 |
| 10 | I | acidic | 2 | 90 | 25 | 3 | 15.4 | 7.8 |
| 11 | I | acidic | 2 | 90 | 25 | 6 | 15.0 | 4.3 |
| 12 | I | basic | 2 | 90 | 25 | 6 | 14.3 | 5.1 |

[a]Acidic initiator refers to the propoxylated glycerol obtained in Example 3 using $HBF_4$ catalysis. Basic initiator refers to a propoxylated glycerol obtained using KOH catalysis.
[b]Wt % of $CO_2$ in final polyol is based on the whole polymer chain (including the initiator and the activation steps).

In Table I, the reaction conditions employed and the results obtained in each example are shown.

As shown in Table I, the DMC catalyst used in the process of the present invention allows obtaining polyether carbonate polyols with a higher content of carbon dioxide compared to a DMC catalyst in which the first washing step is carried out in the presence of TBA, as those used in the prior art (see Ex. 4 vs. Ex. 5 and 6). The content of incorporated carbon dioxide is also improved by the use of a polyether polyol obtained by acidic catalysis as the initiator substance (see Ex. 6, 9 and 12). Remarkably, high content of carbon dioxide is incorporated even under mild conditions (e.g. 90° C., 15-25 bar $CO_2$, only 2-3 activations).

Additionally, the DMC catalyst used in the process of the present invention also leads to a lower ratio of cyclic carbonate to linear polyether carbonate polyol than the DMC catalyst in which the first washing step is carried out in the presence of TBA (see Ex. 4 vs. Ex. 5 and 6).

Further embodiments of the invention will be described in the following numbered paragraphs:

1. A process for the preparation of polyether carbonate polyols comprising copolymerizing one or more H-functional initiator substances, one or more alkylene oxides and carbon dioxide in the presence of a double metal cyanide catalyst, wherein the double metal cyanide catalyst is obtainable by a process comprising:
- a) synthesizing a solid double metal cyanide catalyst in the presence of an organic complexing agent and a polyether polyol ligand; and
- b) first washing the catalyst obtained in step a) with an aqueous solution comprising:
  - 90-100% by weight of water; and
  - 0-10% by weight of a polyether polyol ligand,
  to form a slurry, wherein the aqueous solution does not contain any organic complexing agent other than the polyether polyol ligand.

2. The process according to paragraph 1, which further comprises:
- c) isolating the catalyst from the slurry obtained in step b); and
- d) washing the solid catalyst obtained in step c) with a solution comprising:
  - 90-100% by weight of an organic complexing agent; and
  - 0-10% by weight of a polyether polyol,
  to form a slurry.

3. The process according to paragraphs 1 or 2, wherein the amount of polyether polyol ligand in the aqueous solution in step b) is between 0.05% and 10% with respect to the total weight of solution, preferably between 0.1% and 2%.

4. The process according to paragraphs 1-3, wherein the catalyst obtained in step a) is first brought into contact with water and then brought into contact with the polyether polyol ligand which is preferably in a 0.1 to 5% by weight with respect to the total weight of solution.

5. The process according to paragraphs 1-4, wherein the synthesis of step a) comprises:
- producing a catalyst slurry by reacting an aqueous solution of a metal salt with an aqueous solution of a metal cyanide salt in the presence of an organic complexing agent;
- combining the catalyst slurry with a polyether polyol ligand; and
- isolating a polyether-containing solid catalyst from the slurry.

6. The process according to paragraph 5, wherein the metal salt is selected from zinc chloride, zinc bromide, zinc acetate, zinc acetonylacetate, zinc benzoate, zinc nitrate, iron (II) sulfate, iron (II) bromide, cobalt (II) chloride, cobalt (II) thiocyanate, nickel (II) formate, nickel (II) nitrate and mixtures thereof, preferably it is zinc chloride.

7. The process according to paragraphs 5-6, wherein the metal cyanide salt is selected from potassium hexacyanocobaltate (III), potassium hexacyanoferrate (II), potassium hexacyanoferrate (III) and calcium hexacyanocobaltate (III), preferably it is potassium hexacyanocobaltate (III).

8. The process according to paragraphs 1-7, wherein the synthesis of solid double metal cyanide catalyst is carried out at a temperature ranging from 30 to 70° C.

9. The process according to paragraphs 1-8, wherein the polyether polyol ligand is synthesized by acidic catalysis.

10. The process according to paragraphs 1-8, wherein the polyether polyol ligand is synthesized by basic catalysis.

11. The process according to paragraphs 1-10, wherein the polyether polyol is a poly(oxypropylene) polyol.

12. The process according to paragraph 11, wherein the poly(oxypropylene) polyol has from two to eight hydroxyl groups.

13. The process according to paragraphs 1-12, wherein the polyether polyol is a diol or a triol having number average molecular weight lower than 2000 Da.

14. The process according to paragraphs 1-13, wherein the organic complexing agent is selected from monoalcohols, aldehydes, ketones, ethers, esters, amides, ureas, nitriles, sulfides and mixtures thereof, preferably it is a monoalcohol, more preferably a $C_1$-$C_6$ aliphatic alcohol.

15. The process according to paragraphs 1-14, wherein the double metal cyanide catalyst comprises:
- at least one double metal cyanide;
- at least one organic complexing agent; and
- at least one polyether polyol ligand having a number average molecular weight lower than 2000.

16. The process according to paragraphs 1-15, wherein the alkylene oxide is selected from ethylene oxide, propylene oxide, butene oxides, pentene oxides, hexene oxides, heptene oxides, octene oxides, nonene oxides, decene oxide, undecene oxides, dodecene oxides, cyclopentene oxide, cyclohexane oxide, cycloheptene oxide, cyclooctene oxide and styrene oxide optionally substituted with a $C_1$-$C_6$ alkyl group.

17. The process according to paragraphs 1-16, wherein the H-functional initiator substance is a polyether polyol, preferably having a molecular weight from 100 to 4000 Da.

18. The process according to paragraphs 1-17, wherein the H-functional initiator substance is a polyether polyol obtained by acidic catalysis.

19. The process according to paragraphs 1-18, wherein the H-functional initiator substance is a polyether polyol such as the one used in the synthesis of the DMC catalyst.

20. The process according to paragraphs 1-19, wherein at least one activation step of the DMC catalyst is performed before the copolymerization reaction.

21. The process according to paragraph 20, wherein one, two, three, four or five activation steps of the DMC catalyst are performed before the copolymerization reaction.

22. The process according to paragraphs 20-21, wherein the last activation step is performed in the presence of carbon dioxide.

23. The process according to paragraphs 20-22, wherein only the last activation step is performed in the presence of carbon dioxide.

24. The process according to paragraphs 20-22, wherein all the activation steps are performed in the presence of carbon dioxide.

25. The process according to paragraphs 20-23, wherein at least the first activation step is performed in the absence of carbon dioxide.

26. The process according to paragraphs 20-23, wherein two, three or four activation steps are performed and only the last activation step is performed in the presence of carbon dioxide.

27. The process according to paragraphs 20-26, wherein two activation steps are performed, the first one in the absence of carbon dioxide and the second one in the presence of carbon dioxide.

28. The process according to paragraphs 20-26, wherein three activation steps are performed, the two first ones in the absence of carbon dioxide and the third one in the presence of carbon dioxide.

29. The process according to paragraphs 20-26, wherein four activation steps are performed, the three first ones in the absence of carbon dioxide and the fourth one in the presence of carbon dioxide.

30. The process according to paragraphs 20-29, which comprises the following steps:

(i) the one or more H-functional initiator substances are placed in a vessel and heating and/or vacuum is applied ("drying"), preferably with N₂ stripping, wherein the DMC catalyst is added to the one or more H-functional initiator substances before or after the drying;
(ii) for activation
  (ii-1) in a first activation step, a first partial amount of alkylene oxide (based on the total amount of alkylene oxide used in the process of the invention) is added to the mixture resulting from step (i), in the presence of $CO_2$ or preferably in the absence of $CO_2$,
  (ii-2) in a second activation step, after the activation in the preceding step has been observed, a second partial amount of alkylene oxide (based on the total amount of alkylene oxide used in the process of the invention) is added to the mixture resulting from the preceding step, in the presence or in the absence of $CO_2$,
  (ii-3) optionally in a third activation step, after the activation in the preceding step has been observed, a third partial amount of alkylene oxide (based on the total amount of alkylene oxide used in the process of the invention) is added to the mixture resulting from the preceding step, in the presence or in the absence of $CO_2$,
  (ii-4) optionally in a further activation step, after the activation in the preceding step has been observed, a fourth partial amount of alkylene oxide (based on the total amount of alkylene oxide used in the process of the invention) is added to the mixture resulting from the preceding step in the presence of $CO_2$;
(iii) the rest of alkylene oxide and carbon dioxide are metered continuously into the mixture from step (ii) ("copolimerization").

31. The process according to paragraphs 20-30, wherein the partial amount of alkylene oxide used in the activation steps is in each step from 1.0 to 15.0 wt. %, based on the total amount of alkylene oxide used in the process.

32. The process according to paragraphs 1-31, wherein the DMC catalyst is used in an amount of from 30 to 1000 ppm based on the total weight of the final polyether carbonate polyol.

33. The process according to paragraphs 1-32, wherein the DMC catalyst has been prepared according to a process as defined in any of paragraphs 1-15.

34. A polyether carbonate polyol obtainable by a process as defined in paragraphs 1-33.

35. Use of a polyether carbonate polyol as defined in claim paragraph 34 for the manufacture of polyurethane.

The invention claimed is:

1. A process for the preparation of polyether carbonate polyols comprising copolymerizing one or more H-functional initiator substances, one or more alkylene oxides and carbon dioxide in the presence of a double metal cyanide catalyst, wherein the double metal cyanide catalyst is obtained by a process comprising:
  (a) synthesizing a solid double metal cyanide (DMC) catalyst in the presence of an organic complexing agent and a polyether polyol ligand; and
  (b) first washing the catalyst obtained in step a) with an aqueous solution comprising:
    90-100% by weight of water; and
    0-10% by weight of a polyether polyol ligand,
    to form a slurry, wherein the aqueous solution does not contain any organic complexing agent and wherein the organic complexing agent is not a polyether polyol.

2. The process according to claim 1, which further comprises:
  (c) isolating the catalyst from the slurry obtained in step b); and
  (d) washing the solid catalyst obtained in step c) with a solution comprising:
    -90-100% by weight of an organic complexing agent; and
    0-10% by weight of a polyether polyol,
    to form a slurry.

3. The process according to claim 1, wherein the amount of polyether polyol ligand in the aqueous solution in step b) is between 0.05% and 10% with respect to the total weight of solution.

4. The process according to claim 1, wherein the catalyst obtained in step a) is first brought into contact with water and then brought into contact with the polyether polyol ligand.

5. The process according to claim 1, wherein the polyether polyol ligand has a number average molecular weight lower than 2000 Da.

6. The process according to claim 1, wherein the polyether polyol ligand is a poly(oxypropylene) polyol.

7. The process according to claim 1, wherein the organic complexing agent is selected from monoalcohols, aldehydes, ketones, ethers, esters, amides, ureas, nitriles, sulfides and mixtures thereof.

8. The process according to claim 1, wherein the alkylene oxide is selected from ethylene oxide, propylene oxide, butene oxides, pentene oxides, hexene oxides, heptene oxides, octene oxides, nonene oxides, decene oxide, undecene oxides, dodecene oxides, cyclopentene oxide, cyclohexane oxide, cycloheptene oxide, cyclooctene oxide and styrene oxide optionally substituted with a $C_1$-$C_6$ alkyl group.

9. The process according to claim 1, wherein the H-functional initiator substance is a polyether polyol.

10. The process according to claim 1, wherein the H-functional initiator substance is a polyether polyol obtained by acidic catalysis.

11. The process according to claim 1, wherein at least one activation step of the DMC catalyst is performed before the copolymerization reaction.

12. The process according to claim 11, wherein two, three or four activation steps are performed and only the last activation step is performed in the presence of carbon dioxide.

13. The process according to claim 1, which comprises the following steps:
  (i) the one or more H-functional initiator substances are placed in a vessel and heating and/or vacuum is applied ("drying"), wherein the DMC catalyst is added to the one or more H-functional initiator substances before or after the drying;
  (ii) for activation
    (ii-1) in a first activation step, a first partial amount of alkylene oxide (based on the total amount of alkylene oxide used in the process) is added to the mixture resulting from step (i), in the presence of $CO_2$ or in the absence of $CO_2$,
    (ii-2) in a second activation step, after the activation in the preceding step has been observed, a second partial amount of alkylene oxide (based on the total amount of alkylene oxide used in the process) is added to the mixture resulting from the preceding step, in the presence or in the absence of $CO_2$,
    (ii-3) optionally in a third activation step, after the activation in the preceding step has been observed, a third partial amount of alkylene oxide (based on the total amount of alkylene oxide used in the process) is added to the mixture resulting from the preceding step, in the presence or in the absence of $CO_2$, (ii-4) optionally in a further activation step, after the activation in the preceding step has been observed, a fourth partial amount of alkylene oxide (based on the total amount of alkylene oxide used in the process) is added to the mixture resulting from the preceding step in the presence of $CO_2$; and (iii) the rest of the alkylene oxide and carbon dioxide are metered continuously into the mixture from step (ii) ("copolymerization").

14. The process according to claim 13, wherein the partial amount of alkylene oxide used in the activation steps is in each step from 1.0 to 15.0 wt. %, based on the total amount of alkylene oxide used in the process.

15. The process according to claim 3, wherein the amount of polyether polyol ligand in the aqueous solution in step b) is between 0.1% and 2%.

16. The process according to claim 4, wherein the amount of polyether polyol ligand is 0.1 to 5% by weight with respect to the total weight of solution.

17. The process according to claim 7, wherein the organic complexing agent is a monoalcohol.

18. The process according to claim 13, wherein in step (ii-1) the first partial amount of alkylene oxide (based on the total amount of alkylene oxide used in the process) is added to the mixture resulting from step (i) in the absence of $CO_2$.

* * * * *